United States Patent
Brinker et al.

(10) Patent No.: US 7,809,718 B2
(45) Date of Patent: *Oct. 5, 2010

(54) METHOD AND APPARATUS FOR INCORPORATING METADATA IN DATA CLUSTERING

(75) Inventors: Klaus Brinker, Princeton, NJ (US); Fabian Moerchen, Princeton, NJ (US)

(73) Assignee: Siemens Corporation, Iselin, NJ (US)

( * ) Notice: Subject to any disclaimer, the term of this patent is extended or adjusted under 35 U.S.C. 154(b) by 287 days.

This patent is subject to a terminal disclaimer.

(21) Appl. No.: 12/008,886

(22) Filed: Jan. 15, 2008

(65) Prior Publication Data

US 2008/0183665 A1 Jul. 31, 2008

Related U.S. Application Data

(60) Provisional application No. 60/887,024, filed on Jan. 29, 2007.

(51) Int. Cl.
*G06F 7/00* (2006.01)
(52) U.S. Cl. .................. 707/722; 707/705; 707/706; 707/737
(58) Field of Classification Search .............. 707/2, 707/705, 722–735, 737
See application file for complete search history.

(56) References Cited

U.S. PATENT DOCUMENTS

2003/0037041 A1* 2/2003 Hertz ..................... 707/1
2003/0154181 A1* 8/2003 Liu et al. ................. 707/1
2003/0236659 A1* 12/2003 Castellanos .............. 704/4
2005/0234953 A1* 10/2005 Zhang et al. ............. 707/101
2006/0026152 A1* 2/2006 Zeng et al. ............... 707/5
2007/0118506 A1* 5/2007 Kao et al. ................ 707/3

OTHER PUBLICATIONS

Allan, J., et al., "Detections, Bounds, and Timelines: UMass and TDT-3". Proc. of the Topic Detection and Tracking Workshop (TDT-3), 2000.
Allan, J., et al., "On-line New Event Detection and Tracking". Proc. 21st Annual Int'l. ACM Conf. R&D (SIGIR), 1998.
Brants, T., et al., "A System for New Event Detection". Proc. Int'l. ACM Conf. R&D (SIGIR), ACM Press, 2003.
Franz, M., et al., "Unsupervised and Supervised Clustering for Topic Tracking". Proc. Int'l. ACM Conf. R&D (SIGIR), 2001.
Hatzivassiloglou, V., et al., "An Investigation of Linguistic Features and Clustering Algorithms for Topical Document Clustering". Proc. Int'l. ACM Conf. R&D (SIGIR), 2000.
Kumaran, G., et al., "Text Classification and Named Entities for New Event Detection". Proc. 27th Annual Int'l. ACM SIGIR Conf., USA, pp. 297-304, ACM Press, 2004.

(Continued)

*Primary Examiner*—Apu M Mofiz
*Assistant Examiner*—Jessica N Le

(57) ABSTRACT

Documents in a high density data stream are clustered. Incoming documents are analyzed to find metadata, such as words in a documents headline or abstract and people, places, and organizations discussed in the document. The metadata is emphasized as compared to other words found in the document. A single feature vector for each document determined based on the emphasized metadata will accordingly take into account the importance of such words and clustering efficacy and efficiency are improved.

12 Claims, 5 Drawing Sheets

OTHER PUBLICATIONS

Lam, W., et al., "Using Contextual Analysis for News Event Detection." Int'l. Journal of Intelligent Systems, vol. 16, pp. 525-546, 2001.

Makkonen, J., et al., "Applying Semantic Classes in Event Detection and Tracking". Proc. of Int'l. Conf. on Natural Language Processing (ICON 2002), pp. 175-183, 2002.

Wong, K.-F., et al., "Improving Document Clustering by Utilizing Meta-Data". Proc. of 6th Int'l. Workshop on Information Retrieval with Asian Languages, pp. 109-115, 2003.

Yang, Y., et al., "A Study on Retrospective and On-line Event Detection". ACM 1-58113-015-58/98, 1998.

Yang, Y., et al., "Topic Conditioned Novelty Detection". Proc. of the 8th ACM SIGKDD Int'l. Conf., pp. 688-693, ACM Press, 2002.

* cited by examiner

200

202 → ABC Corp. Merges With XYZ Inc.

204 → XYZ Inc., the world's second largest widget manufacturer, agrees to acquire rival ABC Corp. for $650 million in cash. Joseph Smith is expected to join XYZ Inc. as President while Kashmir Patel will remain as Chairman and CEO of the combined company. The combined firm will retain its headquarters in Frankfurt, Germany and will become the largest widget manufacturer.

206 → Business, World

Frankfurt, DE (NewsService) -- Shares of both XYZ Inc. and ABC Corp jumped today on news that ABC had accepted an all cash offer of $650 million by XYZ. The move was widely expected after XYZ acquired ABC's chief supplier of widget making equipment last quarter.

208 → XYZ will acquire ABC's extensive patent portfolio as well as assume $50 million in debt. Manufacturing facilities are expected to be combined throughout the world.

Joseph Smith is expected to join XYZ Inc. as President while Kashmir Patel will remain as Chairman and CEO of the combined company. The combined firm will retain its headquarters in Frankfurt, Germany and will become the world's largest widget manufacturer.

The merger is a sort of homecoming for Mr. Smith as he started his career with XYZ in 1983 as a widgiteer. Calls to Mr. Smith's office were not immediately returned.

BigFancy Financial is advising XYZ on the merger while...

FIG. 2

| Document | ABC | XYZ | Joseph Smith | Kashmir Patel | Frankfurt | DE | Smith | BigFancy Financial | merge | world | second | large | widget | manufacture | acquire | share | accept | patent | ... |
|---|---|---|---|---|---|---|---|---|---|---|---|---|---|---|---|---|---|---|---|
| Document 200 | 6 | 9 | 2 | 2 | 3 | 3 | 2 | 1 | 2 | 4 | 1 | 3 | 4 | 3 | 2 | 1 | 1 | 1 | |
| ... | | | | | | | | | | | | | | | | | | | |
| Document N | | | | | | | | | | | | | | | | | | | |

| Location | Person | Organization | Headline | Abstract | Category |
|---|---|---|---|---|---|
| 2 | 1.5 | 1.5 | 4 | 2 | 2 |

| Document | ABC | XYZ | Joseph Smith | Kashmir Patel | Frankfurt | DE | Smith | BigFancy Financial | merge | world | second | large | widget | manufacture | acquire | share | accept | patent | ... |
|---|---|---|---|---|---|---|---|---|---|---|---|---|---|---|---|---|---|---|---|
| Document 200 | 11.5 | 16.5 | 3.5 | 3.5 | 5 | 6 | 3 | 1.5 | 5 | 6 | 2 | 5 | 6 | 5 | 3 | 1 | 1 | 1 | |
| ... | | | | | | | | | | | | | | | | | | | |
| Document N | | | | | | | | | | | | | | | | | | | |

METHOD AND APPARATUS FOR INCORPORATING METADATA IN DATA CLUSTERING

This application claims the benefit of U.S. Provisional Patent Application No. 60/887,024 filed on Jan. 29, 2007, which is incorporated herein by reference.

FIELD OF THE INVENTION

The present invention relates generally to data clustering and more particularly to incorporating metadata information extracted from data streams efficiently in online data clustering.

BACKGROUND OF THE INVENTION

Clustering is the classification of objects (e.g., data, documents, articles, etc.) into different groups (e.g., partitioning of a data set into subsets (e.g., clusters)) so the objects in each cluster share some common trait. The common trait may be a defined measurement attribute (e.g., a feature vector) such that the feature vector is within a predetermined proximity to a feature vector of the cluster in which the object may be grouped. Data clustering is used in news article feeds, machine learning, data mining, pattern recognition, image analysis, and bioinformatics, among other areas.

Conventional data clustering can be hierarchical or partitional. Hierarchical data clustering finds successive clusters using previously established clusters, whereas partitional data clustering determines all clusters at once.

Hierarchical algorithms can be agglomerative or divisive. Agglomerative algorithms begin with each object as a separate object or, in some cases, separate clusters, and merge them into successively larger clusters. Divisive algorithms begin with the whole set and it into successively smaller clusters. These algorithms are often iterative. That is, each object and/or each cluster is continually reevaluated to determine if the current cluster for a particular object is the best cluster for that object (e.g., the cluster with the feature vector nearest the feature vector of the object). As new objects enter the clustering system and/or as objects are clustered into new clusters, the feature vectors of the clusters will change, constantly requiring evaluation and/or updating of each object in each cluster.

Partitional algorithms, such as k-means and bisecting k-means algorithms are also conventionally used in clustering. However, such algorithms suffer similar deficiencies as hierarchical algorithms in that they are computationally intense and require multiple iterations. This requires more memory and slows the clustering rate of the system.

The growth of the Internet has allowed rapid dissemination of news articles. News articles produced at a seemingly continuous rate are transmitted from news article producers (e.g., newspapers, wire services, etc.) to news aggregators, such as Google News, Yahoo! News, etc. The news aggregators use combinations of software and human interaction to sort news articles into clusters for display. These clustering methods result in delays in serving articles to users and inaccurate clustering.

Increased access to numerous databases and rapid delivery of information (e.g., high density data streams over the Internet) has overwhelmed such conventional methods of data clustering. Further, end users desire increasingly sophisticated, accurate, and rapidly delivered data clusters. For example, multiple news providers deliver tens of thousands to hundreds of thousands of news articles each day. Each article is evaluated and assigned a measurement attribute, such as one or more feature vectors based on words in the news article. The news articles are streamed to clustering services at such a high rate and volume that multiple iterations, as used in conventional methods, of clustering would significantly slow down clustering systems.

Therefore, alternative methods and apparatus are required to efficiently and accurately cluster objects in continuous high density data streams.

BRIEF SUMMARY OF THE INVENTION

The present invention provides improved methods and apparatus for document clustering. In accordance with an embodiment of the invention, a method of clustering a plurality of documents from a data stream includes identifying metadata in one or more of the plurality of documents, emphasizing one or more words corresponding to the metadata, generating a single feature vector for each of the documents based on the emphasized words, and clustering the documents based on the feature vectors.

Metadata may be found in a document based on the location of certain words in the document, such as in the headline or abstract, or may be based on a part of speech, such as proper nouns describing people, locations, and organizations. The words corresponding to the metadata are emphasized by predetermined multipliers to give greater weight to these words. Accordingly, documents may be clustered in a single pass using a single feature representation for each document and clustering speed and accuracy may be increased.

These and other advantages of the invention will be apparent to those of ordinary skill in the art by reference to the following detailed description and the accompanying drawings.

BRIEF DESCRIPTION OF THE DRAWINGS

FIG. 2 depicts and exemplary document that may be clustered by a document clustering system;

FIG. 3 depicts a word frequency table according to an embodiment of the present invention;

FIG. 4 depicts an emphasis table according to an embodiment of the present invention;

FIG. 5 depicts augmented word frequency table according to an embodiment of the present invention;

DETAILED DESCRIPTION

The present invention generally provides methods and apparatus for online document clustering. Specifically, the present invention provides methods and apparatus for efficient, accurate clustering of documents from continuous high density data streams. For simplicity of presentation, the present invention will be described in terms of a news clustering system and method, though one of skill in the art would recognize how to use the invention described herein in clustering of any type of information, such as in machine learning, data mining, pattern recognition, image analysis, bioinformatics, etc. Accordingly, the term "document" as used herein may be interpreted as any object, file, document, article, sequence, data segment, etc.

Figure 1:
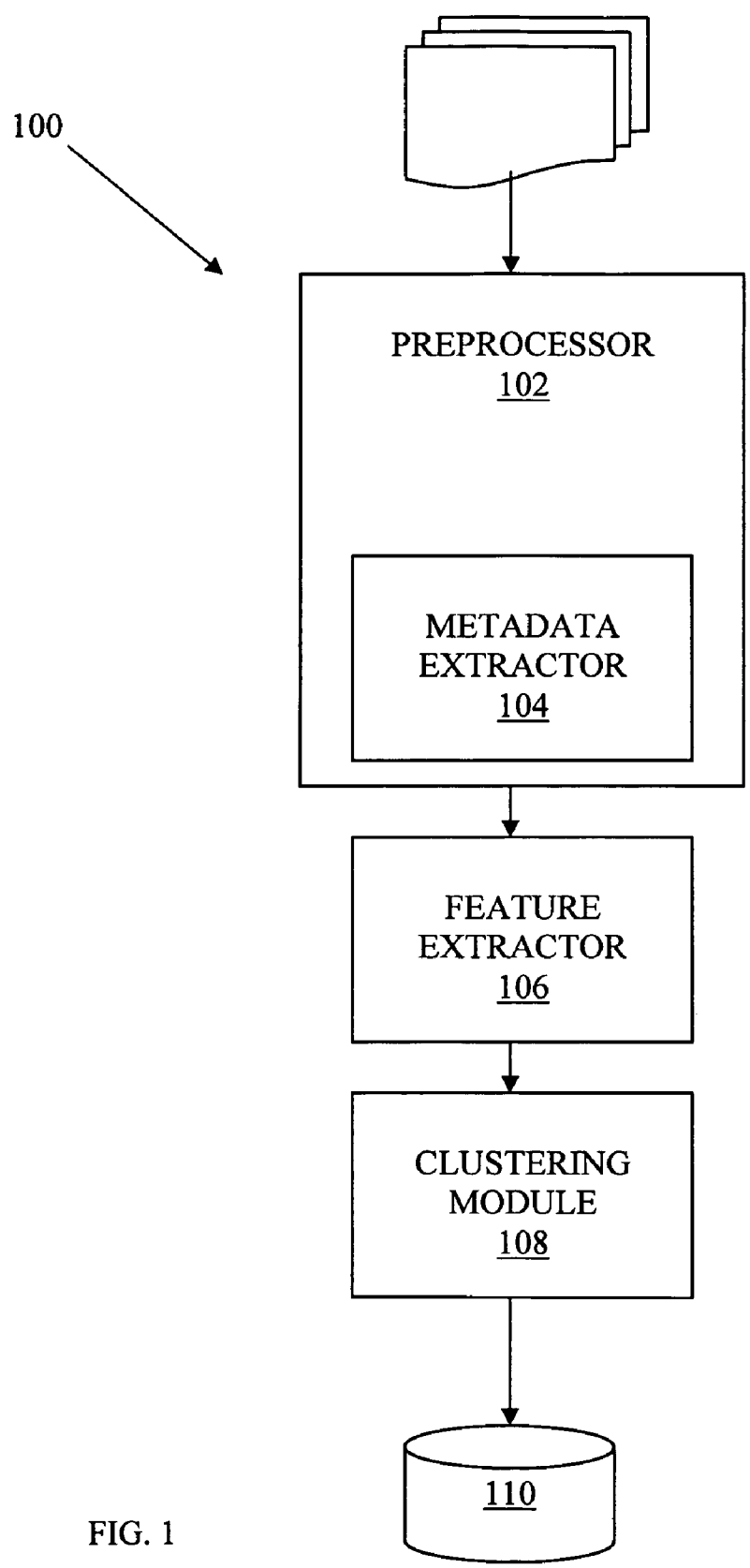
FIG. 1 depicts a document clustering system according to an embodiment of the present invention.

FIG. 1 depicts a document clustering system 100 according to an embodiment of the present invention. Document clustering system 100 includes a preprocessor 102, which receives a stream of data (e.g., multiple documents, etc.) and preprocesses documents. Preprocessor 102 may include a metadata extractor 104, responsible for extracting metadata from documents. After preprocessing and metadata extraction, features may be extracted at a feature extractor 106. Documents may then be clustered at clustering module 108. Finally, clustered documents may be stored in one or more databases 110.

Though described as a document clustering system 100, it should be recognized that the functions of the document clustering system 100 as a whole and/or its constituent parts may be implemented on and/or in conjunction with one or more computer systems and/or controllers (e.g., controller 700 of FIG. 7 discussed below). For example, the method steps of method 600 described below and/or the functions of preprocessor 102, metadata extractor 104, feature extractor 106, and clustering module 108 may be performed by controller 700 of FIG. 7 and the resultant clusters, clustered documents, and/or related information may be stored in one or more internal and/or external databases 110. In an alternative embodiment, one or more controllers (e.g., similar to controller 700) may perform conventional preprocessing of preprocessor 102 and/or feature extraction of feature extractor 106 and a separate one or more controllers (e.g., similar to controller 700) may perform the inventive metadata extraction of metadata extractor 104 and clustering of cluster module 108. The resultant clusters, clustered documents, and/or related information may then be stored in one or more internal and/or external databases (e.g., similar to database 110).

FIG. 2 depicts and exemplary document 200 that may be clustered by document clustering system 100. Document 200 may comprise a number of document sections. Document sections may include a headline (e.g., title, etc.) 202, an abstract 204, a one or more categories 206, and/or a body (e.g., article, text, etc.) 208. Of course, other sections comprising other information (e.g., tables, attachments, references, footnotes, related content, etc.) may be included. As used herein, "words" refers equally to complete words as they appear in a document (e.g., document 200) and word stems as is known unless specifically stated otherwise. Similarly, "words" also refers to sequences, symbols, etc. in other forms of documents.

These document sections 202-208 may be served (e.g., delivered to and/or processed by document clustering system 100) individually or as a unit. In some embodiments, each document section may be denoted (e.g., highlighted, designated, tagged, etc.) as a particular section type to facilitate processing (e.g., preprocessing, metadata extraction, feature extraction, etc.). That is, an article may be served as a block of text with accompanying, internal, and/or external tagging to indicate the beginning and ending of one or more document sections 202-208.

Information (e.g., words, sequences, symbols, etc.) contained in document 100 is referred to as data. That is, the words in an article are data. Accordingly, words of particular importance—due to location in the document, part of speech, etc.—are referred to as metadata. In the same or alternative embodiments, any type of data in a document may be designated as metadata. For example, in bioinformatics, particular nucleotides and/or their respective symbol designations may be metadata. In news articles in general and in the particular example of document 200, metadata may include data in a particular location in the document (e.g., in the headline 202, in the abstract 204, in the category 206, etc.) and/or may include data of certain parts of speech (e.g., proper nouns such as persons, locations, organizations, etc.). For purposes of illustration, part of speech based metadata (e.g., persons, locations, and organizations) in document 200 are shown in bold in FIG. 2. Location based metadata is simply referred to by its corresponding reference numeral.

FIG. 3 depicts a word frequency table 300 according to an embodiment of the present invention. Word frequency table 300 may comprise entries for each word and/or word stem in documents (e.g., document 200, etc.). Word frequency table 300 is illustrative and may be implemented in other ways, such as entries in a feature vector, a feature space, a look-up table, database, separate word frequency tables for each document, etc. Application of the word frequency table 300 will be discussed further with respect to method 600 below.

FIG. 4 depicts an emphasis table 400 according to an embodiment of the present invention. Emphasis table indicates an amount of emphasis to be added to one or more words in document 200. As with word frequency table 300, emphasis table 400, and specifically the weights described therein, may be implemented by any appropriate means and the details of use will be discussed further with respect to method 600 below. Weights may be additive, multiplicative, and/or use another formula or method to determine weights, weighting, and/or emphasis.

FIG. 5 depicts augmented word frequency table 500 according to an embodiment of the present invention. Augmented word frequency table 500 may comprise augmented entries for each word and/or word stem in documents (e.g., document 200, etc.) based on emphases in emphasis table 400. Augmented word frequency table 500 is illustrative and may be implemented in other ways, such as entries in a feature vector, a feature space, a look-up table, database, separate word frequency tables for each document, online and/or offline calculation, etc. Application of the augmented word frequency table 500 will be discussed further with respect to method 600 below.

Figure 6:
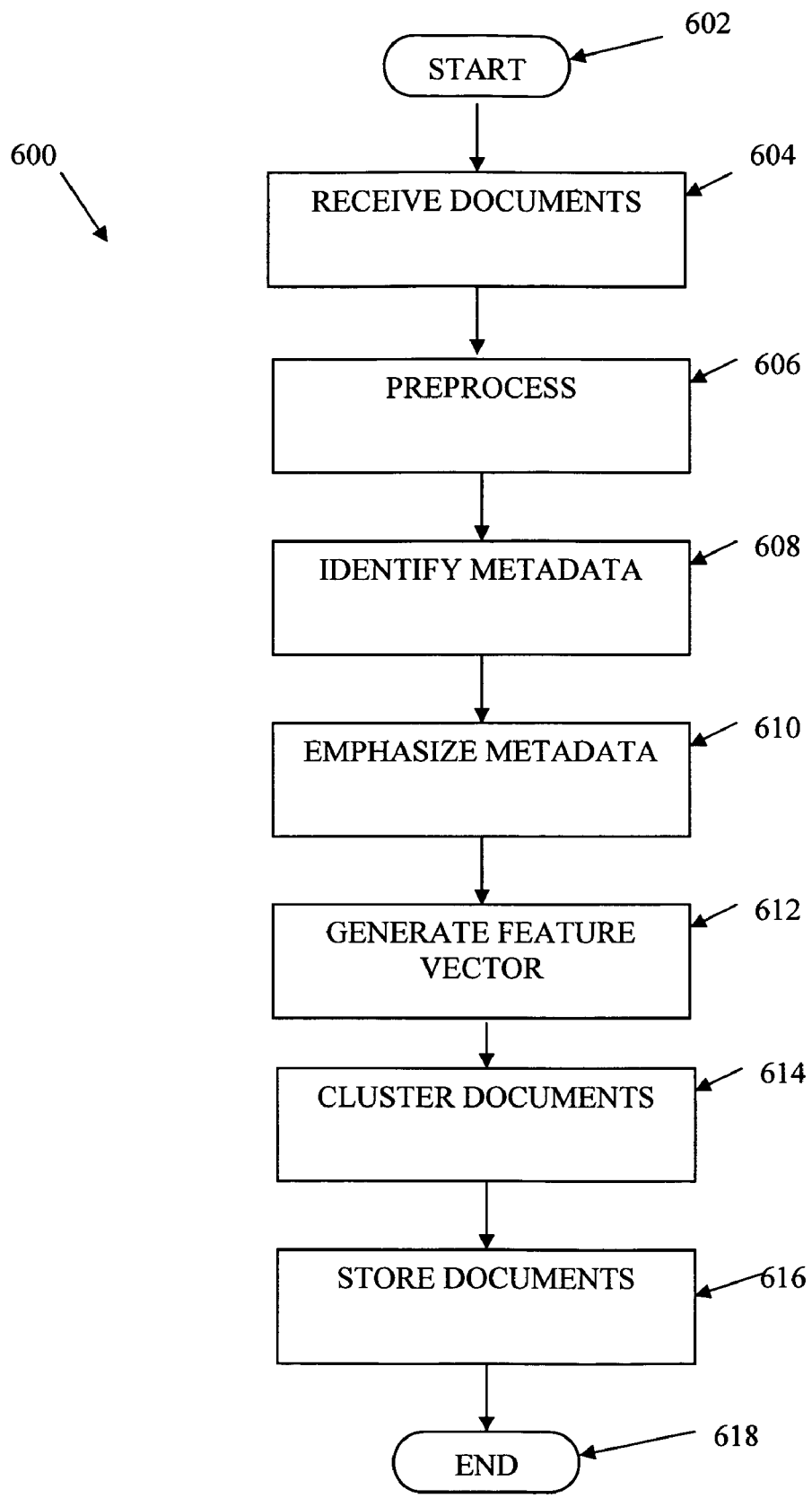
FIG. 6 depicts a flowchart of a method of document clustering according to an embodiment of the present invention.

FIG. 6 depicts a flowchart of a method 600 of document clustering according to an embodiment of the present invention. The document clustering method 600 may be performed by one or more components of document clustering system 100. For purposes of illustration, the clustering of document 200 will be described in detail, though similar clustering methods may be performed on other documents. The method begins at step 602.

In step 604, documents are received. Documents may be news articles in a data stream from one or more online news services, article servers, or other document databases and/or servers. In at least one embodiment, documents may be received over an internal and/or external network, the Internet, or the like. Exemplary document 200 may be received at preprocessor 102, controller 700 of FIG. 7, etc.

After receipt of one or more documents, the documents are preprocessed in step 606 at preprocessor 102. Preprocessing may include text mining and/or data mining as is known. In some embodiments, stop words (e.g., common words) may be removed (e.g., filtered) from consideration. Such stop words may include parts of speech such as articles, copulas, prepositions, etc., and/or other common terms such as corporate designations (e.g., Inc., Corp., SA, etc.), names of authors, news servers or sources (e.g., AP, NY Times, etc.). For example, in document 200, stop words include, but are not limited to, with, Corp., Inc., the, to, in, is, will, NewsService, move, was, of, etc.

In the same or alternative embodiments, preprocessing may include word stemming. That is, words may be reduced to their respective roots (e.g., parts of words common to all variants of that word). In this way, words with the same root are grouped as the same word stem. For example, in document 200, "merge" and "merger" have the same root (e.g., "merge") and are accordingly grouped together in word frequency table 300 and augmented word frequency table 500. In some embodiments, certain words may include entries for both whole words and word stems to accentuate the importance of certain variants of words.

In some embodiments, preprocessing may further include determining the frequencies of words and/or word stems in document 200. That is, preprocessor 102 may populate word frequency table 300. Word frequency table 300 may include an entry for each word and/or word stem found in document 200. Of course, word frequencies may be stored and/or determined in any appropriate way.

In step 608, metadata is identified. Metadata may be identified by metadata extractor 104. As discussed above with respect to FIG. 2, metadata may include data descriptive of the document. In the example of document 200, the metadata is a selected subset of all the words in the document. The subset (e.g., the metadata) may be based on some parameter of the words. For example, the parameter may be a location in the document (e.g., in the headline, in the abstract, in the category, etc.) or a particular type of word (e.g., a person, organization, location, etc.). Determining part of speech, type of word, and/or location in a document is well known in natural language functions and accordingly will not be discussed in further detail herein.

In some embodiments, textual representation of the metadata may be normalized during and/or after identification in step 608. For example, for person names, special characters such as dots or hyphens may be removed and/or for organizations suffixes such as Ltd., Corp., etc. may be removed. Other normalization rules may be utilized as appropriate for other metadata.

In step 610, words and/or word stems corresponding to the metadata are emphasized. In at least one embodiment, metadata is emphasized according to predetermined weights. The weights may be predetermined by any appropriate means. In at least one embodiment, the predetermined weights are set to emphasize metadata in the abstract, headline, and category as well as locations, persons, and organizations by a one-fold weighting factor. That is, each word corresponding to metadata is weighted by a multiplier of two. Such weights may be stored in emphasis table 400 or in any other appropriate manner.

In exemplary emphasis table 400, locations (e.g., Frankfurt, Germany, etc.) from document 200 may be weighted by a multiplier of 2 and people (e.g., Joseph Smith, Kashmir Patel, Smith, etc.) and organizations (e.g., ABC, XYZ, Big-Fancy Financial, etc.) from document 200 may be weighted by a multiplier of 1.5. Similarly, words found in the headline (e.g., ABC, merge, XYZ) of document 200 after preprocessing (e.g., removal of stop words and word stemming) may be weighted by a multiplier of 4, thus showing their particular importance, words found in the abstract (e.g., XYZ, world, large, etc.) of document 200 may be weighted by a multiplier of 2, and words found in the category (e.g., Business, World) may be emphasized with a multiplier of 2. The weights and metadata described herein are merely exemplary. Any appropriate emphasis (e.g., weighting, addition, subtraction, etc.) for any predetermined metadata type (e.g., proper nouns, words in the headline, etc.) may be used.

After emphasizing (e.g., weighting) the metadata, the word frequency table 300 may be updated as augmented word frequency table 500. That is, emphasis may be applied to metadata and the entries in the word frequency table 300 may be adjusted to reflect the increased importance of the metadata. In this way, words will appear to have been found in the document 200 with a greater frequency than they actually are. As may be seen in augmented word frequency table 500, the emphasized metadata skews the word frequencies in favor of the words determined to be metadata.

In step 612, a single feature vector for each document is generated. For example, a feature vector may be an n-dimensional vector of numerical features representing document 200 where n is the number of words in the document and the numerical features are a determined numerical value describing each word. In at least one embodiment, the numerical value (e.g., feature of each word) is a Term Frequency Inverse Document Frequency (TFIDF) determined as follows:

Term Frequency (TF) is the number of times a word appears in document 200. In at least one embodiment, this information may come from augmented word frequency table 500. That is, word frequencies emphasized in step 608 may be used in the calculation of feature vectors. Accordingly, metadata is emphasized with respect to the document and the resultant feature vectors similarly emphasize the metadata words. In an alternative embodiment, feature vector(s) may first be calculated using un-emphasized word frequencies (e.g., from word frequency table 300) and the resultant feature vector(s) may then be emphasized based on predetermined emphases (e.g., from emphasis table 400).

In calculation of TFIDF, N is the number of documents processed, Document Length ($DL_i$) is the length of the $i^{th}$ document in words, and Document Frequency (DF) is the number of documents having each word.

TF' may then be $$\left( \frac{TF}{TF + 0.5 + \frac{1.5 \cdot DL_N}{\frac{1}{N} \cdot \sum_{i=1}^{N} DL_i}} \right).$$

Inverse Document Frequency (IDF) is $$\left( \frac{\log\left(\frac{N + 0.5}{DF}\right)}{\log(N + 1)} \right).$$

TFIDF may then be determined as TF'·IDF or $$TFIDF = \left( \frac{TF}{TF + 0.5 + \frac{1.5 \cdot DL_N}{\frac{1}{N} \cdot \sum_{i=1}^{N} DL_i}} \right) \cdot \left( \frac{\log\left(\frac{N + 0.5}{DF}\right)}{\log(N + 1)} \right).$$

In some embodiments, to ensure bounded memory consumption, the number of words included in word frequency table 300 (and thus used in calculation of TFIDF) may be limited to a predetermined number. In such embodiments, the words that have not appeared in a document in the longest amount of time are discarded. That is, the words that have not repeated in the longest period of time are discarded to make room for words from newer documents.

In this way, a feature vector is generated with a numerical value representing each word found in the document 200.

In step 614, documents are clustered. As discussed above, high density data streams favor single-pass clustering for timely, efficient clustering. Clustering based on the emphasized metadata and resultant feature vectors allows accurate grouping of documents without multiple iterations of clustering.

Clusters may each have a feature vector indicative of the documents in that cluster. That is, a feature vector describing all the documents in each cluster may be generated as is known.

In one embodiment, a document's (e.g., document 200) feature vector is compared to all known (e.g., predetermined) clusters. That is, the distances between features in the document and features in the clusters are determined. The distance may be a cosine distance $$D_c(\vec{d}_i, \vec{d}_j) = 1 - \frac{\sum_{k=1}^{T} d_{ik} d_{jk}}{\sqrt{\sum_{k=1}^{T} d_{ik}^2 \cdot \sum_{k=1}^{T} d_{jk}^2}}$$

where $\vec{d} = [d_1, \ldots, d_T]$ is the feature vector determined in step 612. Thus, $D_c(\vec{d}_i, \vec{d}_j)$ is a distance measure between the feature vector of the document and the feature vector of the cluster. In some embodiments, each feature vector is normalized to a unit length, eliminating the renormalization otherwise necessary for every distance computation.

If the distance measure is below a predetermined threshold, the document is added to the cluster. If no cluster is found where the distance measure is below the threshold, the document forms a new cluster. Of course, other distance measures may be used. In some embodiments similarity measures may be used. The similarity measure may then be compared to a predetermined threshold and, if the similarity measure exceeds the predetermined threshold, the document is added to the cluster.

In some embodiments, to process documents more quickly, an incoming document is only compared to clusters that have been updated within a predetermined period of time. That is, newly incoming documents may only be compared to clusters that have had another document added to them within a predetermined time window. In this way, out of date stories and/or clusters are not considered and processing time may be reduced.

In the same or alternative embodiments, any appropriate method of clustering may be used. In some embodiments, an indexing structure for efficient retrieval of the nearest neighbor may be used in clustering. Using the single feature vector for each document generated in step 612, a single index can be used to determine the closest cluster among the set of candidate clusters without performing an exhaustive search, improving the clustering speed over methods multiple feature vectors. In prior methods using multiple feature vectors to represent each document and each cluster, several index structures would need to be maintained and queried. This would require more computations and memory than the inventive method described herein. Furthermore, in prior methods the nearest neighbors reported by each index could be different, thus requiring additional strategies to determine the nearest cluster with respect to all feature vectors.

After clustering, the documents, clusters, and/or information about the documents and/or clusters are stored in one or more databases 110 in step 616. The method ends at step 618.

Figure 7:
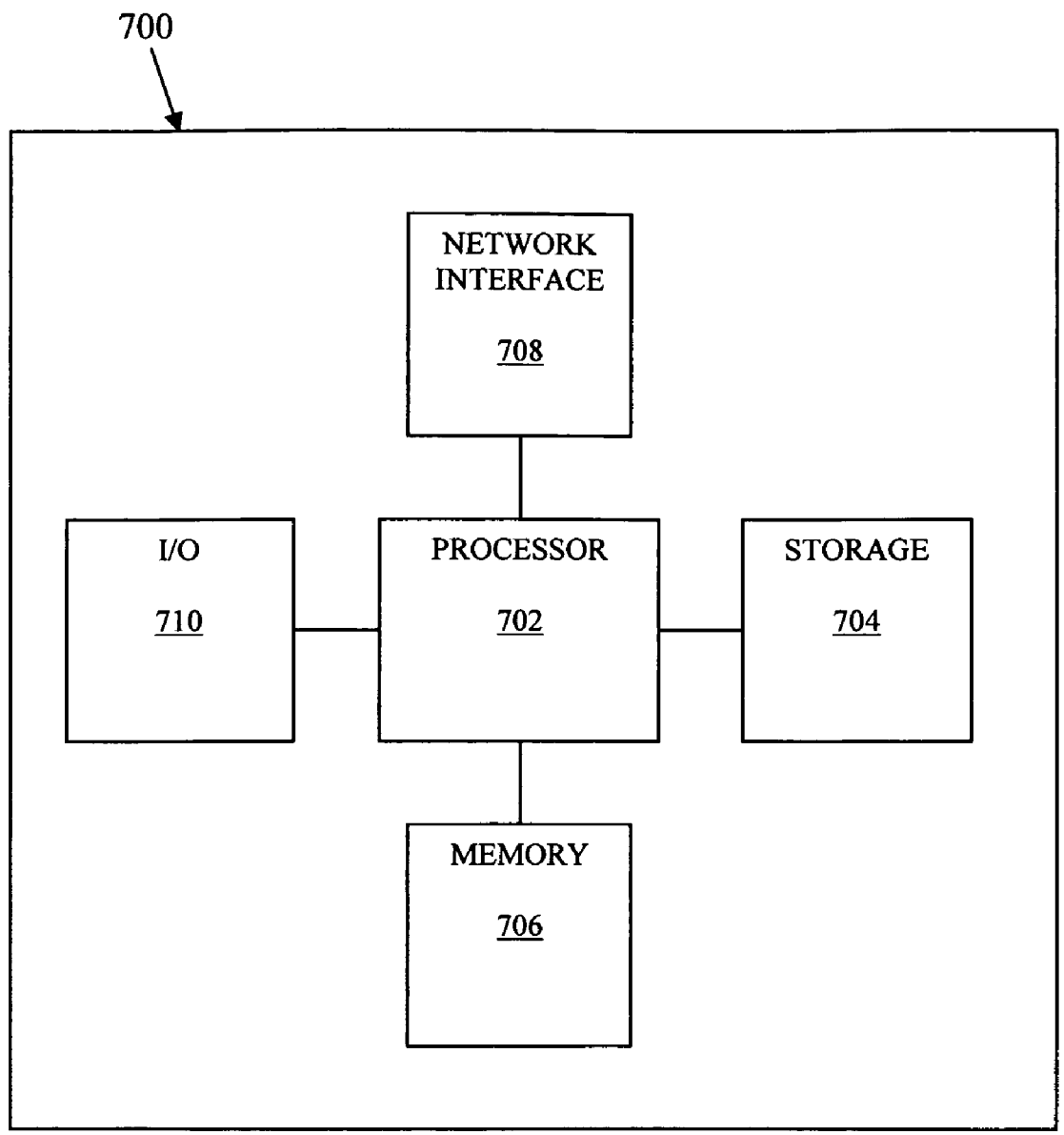
FIG. 7 is a schematic drawing of a controller.

FIG. 7 is a schematic drawing of a controller 700 according to an embodiment of the invention. Controller 700 may be used in conjunction with and/or may perform the functions of document clustering system 100 and/or the method steps of method 600.

Controller 700 contains a processor 702 that controls the overall operation of the controller 700 by executing computer program instructions, which define such operation. The computer program instructions may be stored in a storage device 704 (e.g., magnetic disk, database, etc.) and loaded into memory 706 when execution of the computer program instructions is desired. Thus, applications for performing the herein-described method steps, such as preprocessing, metadata extraction, feature extraction, and clustering, in method 600 are defined by the computer program instructions stored in the memory 706 and/or storage 704 and controlled by the processor 702 executing the computer program instructions. The controller 700 may also include one or more network interfaces 708 for communicating with other devices via a network. The controller 700 also includes input/output devices 710 (e.g., display, keyboard, mouse, speakers, buttons, etc.) that enable user interaction with the controller 700. Controller 700 and/or processor 702 may include one or more central processing units, read only memory (ROM) devices and/or random access memory (RAM) devices. One skilled in the art will recognize that an implementation of an actual controller could contain other components as well, and that the controller of FIG. 7 is a high level representation of some of the components of such a controller for illustrative purposes.

According to some embodiments of the present invention, instructions of a program (e.g., controller software) may be read into memory 706, such as from a ROM device to a RAM device or from a LAN adapter to a RAM device. Execution of sequences of the instructions in the program may cause the controller 700 to perform one or more of the method steps described herein, such as those described above with respect to method 600. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 706 may store the software for the controller 700, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of clustering a plurality of documents from a data stream comprising:
    identifying, by a processor, metadata in the plurality of documents;
    emphasizing, by the processor, one or more words corresponding to the metadata;
    generating, by the processor, a single feature vector for each of the plurality of documents based at least in part on the emphasized words by determining a numerical value for each word in one or more of the plurality of documents by determining a Term Frequency Inverse Document Frequency (TFIDF):

$$TFIDF = \left( \frac{TF}{TF + 0.5 + \frac{1.5 \cdot DL_N}{\frac{1}{N} \cdot \sum_{i=1}^{N} DL_i}} \right) \cdot \left( \frac{\log\left(\frac{N+0.5}{DF}\right)}{\log(N+1)} \right)$$

wherein TF is the frequency of each word, N is a number of documents, $DL_i$ is a length of the $i^{th}$ document in words, and DF is the number of documents having each word;
    clustering, by the processor, the plurality of documents based at least in part on the generated feature vectors; and
    mining the data by removing stop words from one or more documents and determining frequencies of words remaining in the one or more documents.

2. The method of claim 1 wherein the plurality of documents are text articles received from an article server.

3. The method of claim 2 wherein the data stream is a continuous stream.

4. The method of claim 1 wherein said identifying metadata in the plurality of documents comprises:
    selecting a subset of words based on parameters of the words with respect to the document; and
    identifying a feature vector corresponding to each of the words in the subset of words.

5. The method of claim 4 wherein the parameters of the words comprise at least one of:
    locations of the words in the documents, physical location names detected in the documents, person names detected in the documents, and organization names detected in the document.

6. The method of claim 5 wherein the locations of the words are selected from the group of a headline, an abstract, a category, and a title.

7. The method of claim 1 wherein said emphasizing one or more words corresponding to the metadata comprises emphasizing the one or more words with one or more multiplicative weights.

8. The method of claim 1 wherein said emphasizing one or more words corresponding to the metadata comprises emphasizing the one or more words with one or more additive weights.

9. An apparatus for clustering a plurality of documents from a data stream comprising:
    a memory device for storing a program;
    a processor in communication with the memory device, the processor comprising:
    means for identifying metadata in the plurality of documents;
    means for emphasizing one or more words corresponding to the metadata;
    means for generating a single feature vector for each of the plurality of documents based at least in part on the emphasized words by determining a numerical value for each word in one or more of the plurality of documents by determining a Term Frequency Inverse Document Frequency (TFIDF):

$$TFIDF = \left( \frac{TF}{TF + 0.5 + \frac{1.5 \cdot DL_N}{\frac{1}{N} \cdot \sum_{i=1}^{N} DL_i}} \right) \cdot \left( \frac{\log\left(\frac{N+0.5}{DF}\right)}{\log(N+1)} \right)$$

wherein TF is the frequency of each word, N is a number of documents, $DL_i$ is a length of the $i^{th}$ document in words, and DF is the number of documents having each word;
    means for clustering the plurality of documents based at least in part on the generated feature vectors; and
    means for mining the data by removing stop words from one or more documents and determining frequencies of words remaining in the one or more documents.

10. The apparatus of claim 9 wherein the means for identifying metadata in the plurality of documents comprises:
    means for selecting a subset of words based on parameters of the words with respect to the document; and
    means for identifying a feature vector corresponding to each of the words in the subset of words.

11. A non-transitory computer-readable storage medium having program instructions stored thereon, the instructions defining the steps of:
    clustering a plurality of documents from a data stream by:
        identifying metadata in the plurality of documents;
        emphasizing one or more words corresponding to the metadata;
        generating a single feature vector for each of the plurality of documents based at least in part on the emphasized words by determining a numerical value for each word in one or more of the plurality of documents by determining a Term Frequency Inverse Document Frequency (TFIDF):

$$TFIDF = \left( \frac{TF}{TF + 0.5 + \frac{1.5 \cdot DL_N}{\frac{1}{N} \cdot \sum_{i=1}^{N} DL_i}} \right) \cdot \left( \frac{\log\left(\frac{N+0.5}{DF}\right)}{\log(N+1)} \right)$$

wherein TF is the frequency of each word, N is a number of documents, $DL_i$ is a length of the $i^{th}$ document in words, and DF is the number of documents having each word; clustering the plurality of documents based at least in part on the generated feature vectors; and
means for mining the data by removing stop words from one or more documents and determining frequencies of words remaining in the one or more documents.

12. The computer-readable storage medium of claim 11, wherein the instructions for identifying metadata in the plurality of documents further define the steps of:
selecting a subset of words based on parameters of the words with respect to the document; and
identifying a feature vector corresponding to each of the words in the subset of words.

\* \* \* \* \*